US008320251B2

(12) United States Patent
Guguen et al.

(10) Patent No.: US 8,320,251 B2
(45) Date of Patent: Nov. 27, 2012

(54) METHOD AND DEVICE FOR TRANSMITTING DATA PACKETS

(75) Inventors: Charline Guguen, Bourgbarré (FR); Ludovic Jeanne, Rennes (FR); Patrick Fontaine, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 4 days.

(21) Appl. No.: 12/225,057

(22) PCT Filed: Mar. 7, 2007

(86) PCT No.: PCT/EP2007/052145
§ 371 (c)(1),
(2), (4) Date: Feb. 4, 2009

(87) PCT Pub. No.: WO2007/104688
PCT Pub. Date: Sep. 20, 2007

(65) Prior Publication Data
US 2009/0303999 A1    Dec. 10, 2009

(30) Foreign Application Priority Data
Mar. 13, 2006 (FR) .................................. 06 50844

(51) Int. Cl.
*G01R 31/08* (2006.01)
(52) U.S. Cl. ......................................... 370/235
(58) Field of Classification Search .......... 370/235, 370/348, 352, 428; 455/557
See application file for complete search history.

(56) References Cited

U.S. PATENT DOCUMENTS

| 6,738,881 | B1* | 5/2004 | Ollivier et al. ............... 711/168 |
| 7,079,865 | B1* | 7/2006 | Farazmandnia et al. ...... 455/557 |
| 7,161,909 | B2* | 1/2007 | Sharma ......................... 370/235 |
| 2002/0035658 | A1* | 3/2002 | Whetsel ......................... 710/300 |
| 2002/0087732 | A1 | 7/2002 | Boucher et al. |
| 2003/0235187 | A1* | 12/2003 | Iwama et al. .................. 370/352 |
| 2005/0041450 | A1* | 2/2005 | Duh et al. .......................... 365/1 |
| 2005/0276255 | A1* | 12/2005 | Aiello et al. .................... 370/348 |
| 2006/0002416 | A1* | 1/2006 | Yagihashi ....................... 370/428 |
| 2006/0114899 | A1* | 6/2006 | Toumura et al. ............... 370/389 |

FOREIGN PATENT DOCUMENTS
WO    WO 02/087174    10/2002

OTHER PUBLICATIONS

Search Report Dated Jul. 4, 2007.

* cited by examiner

*Primary Examiner* — Michael Thier
*Assistant Examiner* — Awet Haile
(74) *Attorney, Agent, or Firm* — Myers Wolin, LLC (57) ABSTRACT

In order to simplify the management of packets to be transmitted, we implement:
a writing to a first register of at least one descriptor of packets to be transmitted, each descriptor of packets to be transmitted comprising information representative of a status of each packet belonging to the set, the status of each packet indicating whether the packet is or is not to be transmitted;
determination of the first packet of data to be transmitted on the basis of the content of the first register and recording of an identifier of the first packet of data to be transmitted in a second register; and
transmission of a set of data packets.

14 Claims, 6 Drawing Sheets

METHOD AND DEVICE FOR TRANSMITTING DATA PACKETS

This application claims the benefit, under 35 U.S.C. §365 of International Application PCT/EP2007/052145, filed Mar. 7, 2007, which was published in accordance with PCT Article 21(2) on Sep. 20, 2007 in English and which claims the benefit of French patent application No. 0650844 filed Mar. 13, 2006.

FIELD OF THE INVENTION

The present invention relates to the field of telecommunications and more precisely the transmission of packets at high speed.

TECHNOLOGICAL BACKGROUND

According to the state of the art, methods for transmitting data packets implement mechanisms for acknowledging packets so as to retransmit the erroneous packets.

In the MAC (standing for "Medium Access Channel") layer, the data to be transmitted or MSDU (standing for "MAC Service Data Unit") are encapsulated in PDUs (standing for "Protocol Data Units") with a MAC header. When MSDUs are transmitted, they can be bundled (several fragments of several MSDUs being transmitted in a single PDU) or simply fragmented (only a part (or fragment) of an MSDU is transmitted in a PDU, the remaining parts being transmitted in one or more other PDUs). For communications with ARQ (standing for "Automatic Repeat Request"), an MSDU fragment is divided into several blocks and each block must be acknowledged. According to an IEEE 802.16 standard, a fragment must comprise consecutive blocks which have not been dispatched or acknowledged.

Figure 1:
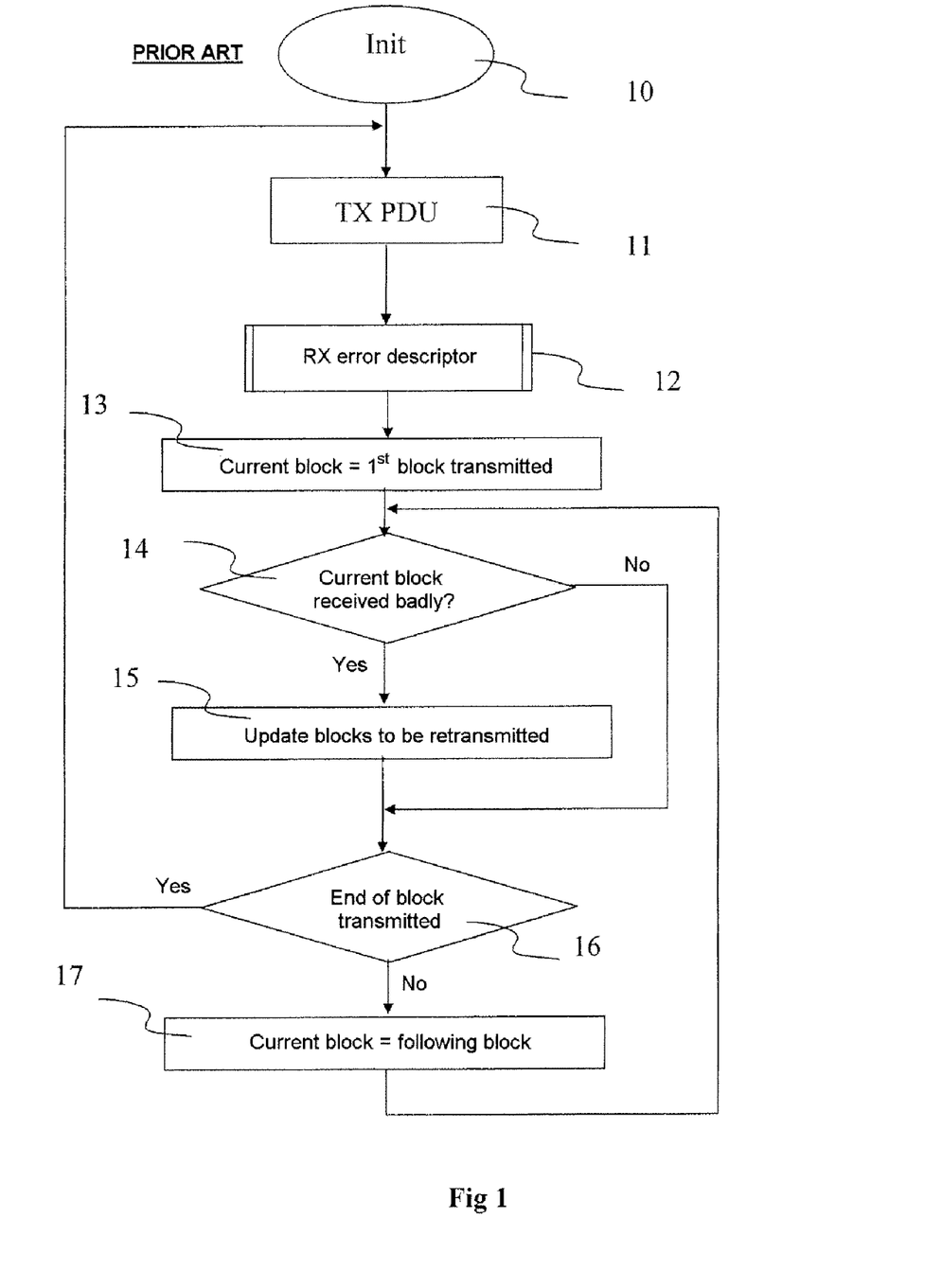
FIG. 1 illustrates an implementation of a packet transmission known per se.

Such a method implemented by a microprocessor of a sending/receiving station is illustrated opposite FIG. 1 and begins with an initialization step 10 in the course of which a variable indicating the current block points to the first block to be transmitted. Then, in the course of a step 11, one or more data packets corresponding to an MSDU corresponding to a set of blocks are transmitted. Thereafter, in the course of a step 12, the station waits and receives an error descriptor, each block transmitted being acknowledged or not as a function of a good or bad reception by its recipient. Then, in the course of a test 13, the microprocessor initializes a current block pointer corresponding to the first block transmitted. Thereafter, in the course of a test 14, the microprocessor verifies whether the current block has indeed been received by its recipient. In the affirmative, in the course of a step 15, the microprocessor updates the list of the blocks to be retransmitted by inserting thereinto the block corresponding to the current block. In the negative or following step 15, in the course of a test 16, the microprocessor verifies whether the current block corresponds to the last block transmitted. In the affirmative, step 11 is repeated, the blocks transmitted corresponding to new blocks or to blocks to be retransmitted corresponding to the list updated in the course of step 15. In the negative, in the course of a step 17, the microprocessor updates the pointer to the current block by pointing it at the following block transmitted. Thereafter, the test 14 is repeated. Thus, the process for updating the list of blocks to be transmitted (first transmission or retransmission following a bad acknowledgement) is relatively lengthy since the number of elementary operations is large (at least 2 times (corresponding to steps 14 and 17) the number of blocks present in an MSDU). This technique therefore presents the drawback of being poorly suited to applications (for example of audio-visual stream transmission type) requiring high reactivity.

SUMMARY OF THE INVENTION

The invention is aimed at alleviating these drawbacks of the prior art.

More particularly, the objective of the invention is to improve the performance of a communication system (for example, the speed of determination of data blocks to be transmitted on a communication link, in particular following receipt of a retransmission request).

For this purpose, the invention proposes a method for transmitting data packets, comprising the following steps:
  writing to a first register of at least one descriptor of packets to be transmitted, each descriptor of packets to be transmitted comprising information representative of a status of each packet belonging to the set, the status of each packet indicating whether the packet is or is not to be transmitted;
  determination of the first packet of data to be transmitted on the basis of the content of the first register and recording of an identifier of the first packet of data to be transmitted in a second register; and
  transmission of a set of data packets.

According to a particular characteristic, the step of determining the first packet is an elementary step performed in at most a number of clock cycles that is strictly less than the size of the first register expressed as a number of binary data and preferably in at most one clock cycle.

According to a preferred characteristic, the method comprises a step of determining the number of consecutive packets to be transmitted with the first packet of data to be transmitted.

Advantageously, the step of determining the number of consecutive packets to be transmitted is an elementary step performed in at most a number of clock cycles that is strictly less than the size of the first register expressed as a number of binary data and preferably in at most one clock cycle.

Preferably, the steps of determining the first packet and of determining the number of consecutive packets to be transmitted are simultaneous.

According to an advantageous characteristic, the method comprises a step of recording the number of consecutive packets to be transmitted in the second register.

Advantageously, the reading of the second register brings about a purely electronic updating of the first register, of the status of each packet indicated as having to be transmitted by the second register.

According to a particular characteristic, the reading of the second register and the updating of the corresponding first register are done in at most one clock cycle.

According to a particular characteristic, at least one of the descriptor or descriptors of packets to be transmitted is a descriptor of current state of transmission of packets updated after a reception of an acknowledgement of packets corresponding to packets transmitted previously or expiry of a timeout following a transmission of packets.

Advantageously, the steps of determining the first packet of data to be transmitted on the basis of the content of the first register and of recording an identifier of the first packet of data to be transmitted in a second register are repeated as long as the descriptor comprises information representative of a status corresponding to packets to be transmitted.

Preferably, the packet corresponding to a status is identified, at least in part, by the position of an information representative of the status.

According to a particular characteristic, the transmission of a set of data packets is performed on a wireless channel.

The invention also relates to a device for transmitting data packets, which comprises:
- means for writing to a first register at least one descriptor of packets to be transmitted, each descriptor of packets to be transmitted comprising information representative of a status of each packet belonging to the set, the status of each packet indicating whether the packet is or is not to be transmitted;
- means for determining the first packet of data to be transmitted on the basis of the content of the first register and means for recording an identifier of the first packet of data to be transmitted in a second register; and
- means for transmitting a set of data packets.

LIST OF FIGURES

The invention will be better understood, and other features and advantages will appear on reading the description which will follow, the description referring to the appended drawings among which.

DETAILED DESCRIPTION OF THE INVENTION

Figure 2:
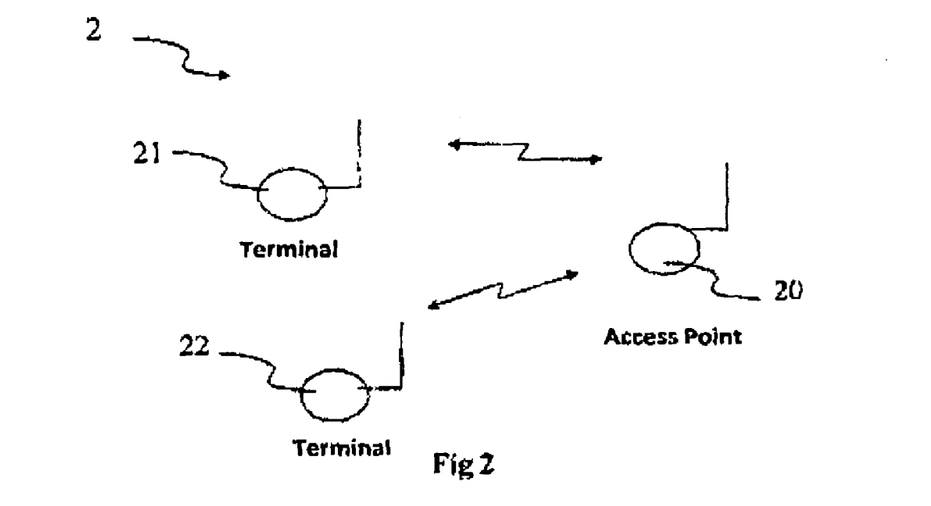
FIG. 2 represents a communication network according to a particular embodiment of the invention.

FIG. 2 represents a communication network 2 according to a particular embodiment of the invention.

The network 2 is, for example, a wireless network of the IEEE 802.16 type and comprises:
- an access point 20;
- terminals 21 and 22.

The access point 20 is able to send or receive MSDUs destined for the terminals 21 and 22 on the wireless link.

Figure 3:
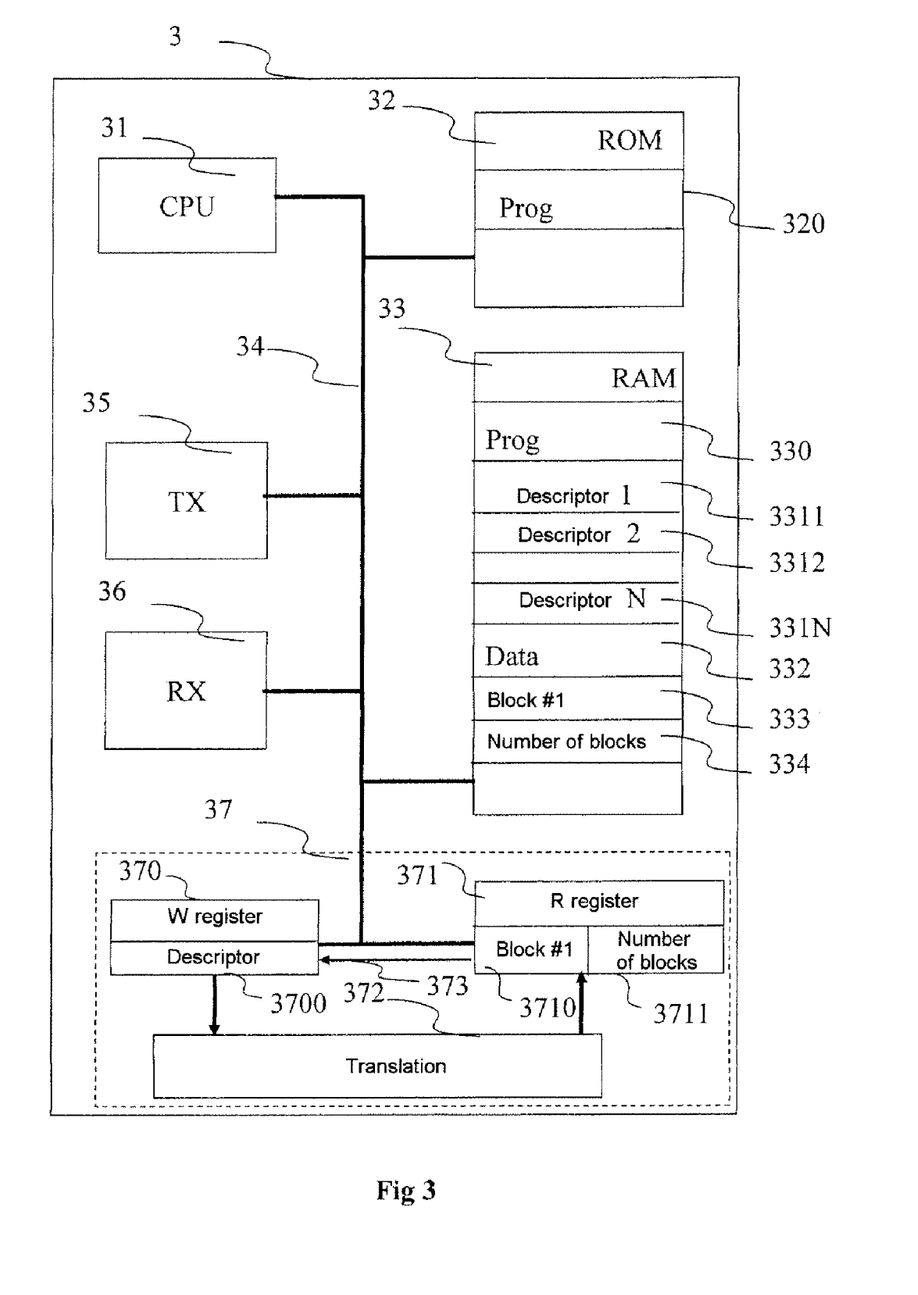
FIG. 3 diagrammatically illustrates an apparatus of the communication network of FIG. 2, according to a particular embodiment of the invention.

FIG. 3 diagrammatically illustrates an apparatus 3 corresponding to the access point 20 or to one of the terminals 21 and 22.

The apparatus 3 comprises, linked together by an address and data bus 34, also transporting a clock signal:
- a microprocessor 31 (or CPU);
- a nonvolatile memory of ROM type (standing for "Read Only Memory") 32;
- a random access memory or RAM 33;
- a module 35 for transmitting a signal on the wireless link;
- a module 36 for receiving a signal on the wireless link; and
- a module 37 for managing blocks to be transmitted.

Moreover, each of the elements 31 to 37 is well known to the person skilled in the art. These common elements are not described here.

It is observed that the word "register" used in the description designates, in each of the memories mentioned, either a memory area of small capacity (a few binary data) or a memory area of large capacity (making it possible to store an entire program or all or some of the data representative of an audio/video service received).

The ROM memory 32 comprises in particular a program "prog" 320.

The algorithms implementing the steps of the method described hereafter are stored in the ROM memory 32 associated with the apparatus 3 implementing these steps. On power-up, the microprocessor 31 loads and executes the instructions of these algorithms.

The random access memory 33 comprises in particular:
- in a register 330, the operating program of the microprocessor 31 loaded on power-up of the apparatus 3;
- N descriptors in registers 3311 to 331N;
- audiovisual data and/or MDSU containing these data in a register 332;
- a variable of first block to be transmitted in a register 333; and
- a variable of number of blocks to be transmitted in a register 334.

The module 37 for managing blocks to be transmitted comprises:
- a module 370 comprising a register 3700 intended in particular for the writing by the CPU 31 of a descriptor and having its own address so as to be write-accessible by the CPU 31 via the bus 34;
- a module 371 comprising a register 3710 identifying a first block and a register 3711 identifying a number of blocks which the CPU 31 can read-access, the registers 3710 and 3711 each having their own address so as to be read-accessible by the CPU 31 via the bus 34; and
- a module 372 for translating the content of the register 3700 into an identifier of first block and into a number of blocks.

According to the invention, the module 37 is an electronic block comprising one or more discrete components (for example of the programmable ASIC or programmable component type) or inserted totally or in part in a component comprising other functions (for example ASIC comprising the memories 32 and/or 33 and/or the CPU 31).

According to the embodiment described the descriptors comprise 32 bits. According to variant embodiments of the invention, the descriptors have a fixed size different from 32 (being able to range from a few bits (for example 8) to several hundreds or thousands of bits) or a variable size. Typically, each bit of the descriptor corresponds to the status of a block to be transmitted: thus, a value of the status equal to 0 corresponds to a block to be transmitted (either for a first transmission, or for a retransmission). Of course, according to the invention, other meanings or values (for example values opposite to those previously described) and other formats (for example several bits) for the status are possible.

For reasons of clarity, only the descriptors relating to the blocks "to be transmitted" are described here. Other descriptors can be implemented in particular descriptors of blocks acknowledged. The latter are updated during a transmission (transmitted blocks indicated as not acknowledged) and on receipt of an acknowledgement frame (indications updated as a function of the content of the acknowledgement frame). On receipt of an acknowledgement frame (or of an error descriptor), the transmitted descriptors are also updated with a simple operation performed bitwise on the description of blocks to be transmitted.

The translation module 372 is implemented in electronic form and preferably in the form of logic circuits in a programmable component (for example gatearray), PLD® (standing for "Programmable Logic Device")) or in an ASIC. Such a circuit is, for example, obtained and optimized by a VHDL definition of its content, corresponding, for example, to the following logic equations:

as a function of the value of the bits read as input, the output for the number of the first block equals
0 if first bit=0;
1 if first 2 bits=10 (the first bit read as input being that represented on the left);
2 if first 3 bits=110;
3 if first 4 bits=1110 and
more generally n if the first (n+1) bits equal 1 (n times)0;
the word of 32 bits at input is thereafter shifted left by the value of the number of the first block with right insertion of 1;
then, as a function of the shifted word, the output for the number of bits equals:
1 if first 2 bits=01 (the first bit of the shifted word being that represented on the left);
2 if first 3 bits=001;
3 if first 4 bits=0001 and
more generally n if the first (n+1) bits equal 0(n times)1;

Such an implementation of the module 372 presents the advantage of comprising simple logic functions and requiring relatively few logic gates.

Moreover, the translation module reads directly in the register 3700 the descriptor the value of which it converts into a number of first block and into a number of blocks. The latter are automatically stored in the respective registers 3710 and 3711 by the module 372. Thus, the content of the register 3700 is almost immediately translated, with a translation recorded in the registers 3710 and 3711. In this way, in less than a clock cycle, following the writing to the register 3700, the registers 3710 and 3711 are updated. The CPU 31 writing a descriptor to the register 3700 can therefore read right from the clock cycle following the content of the registers 3710 and 3711.

According to an advantageous embodiment of the invention, a read-access of the two registers 3710 and 3711 brings about an automatic update of the content of the register 3700 via a link 373 between the modules 371 and 370. This update can be performed by reading one of the registers assuming that this register is read after the other or by storing the reads of the two registers and setting to zero as soon as the automatic update of the register 3700 is performed. Preferably, the automatic update is performed during the clock cycle of the last read to avoid the conflicts of write-access to the register 3700. To perform the update, the module 371 generates a mask of a word of 32 bits of which the first m bits are set to 1 and the (32−m+1) bits are set to 0, m representing the sum of the contents of the registers 3710 and 3711. The electronic implementation of this mask generation can be obtained on the basis of a VHDL code of a shift register initialized to 0 and in which we perform m shift with a 1 as input. This mask is presented on the link 373 with a command signal for the module 370 so as to bring about the writing to the register 3700 of the result of an "or" operation performed bitwise between the current content of the register 3700 and the mask.

Figure 4:
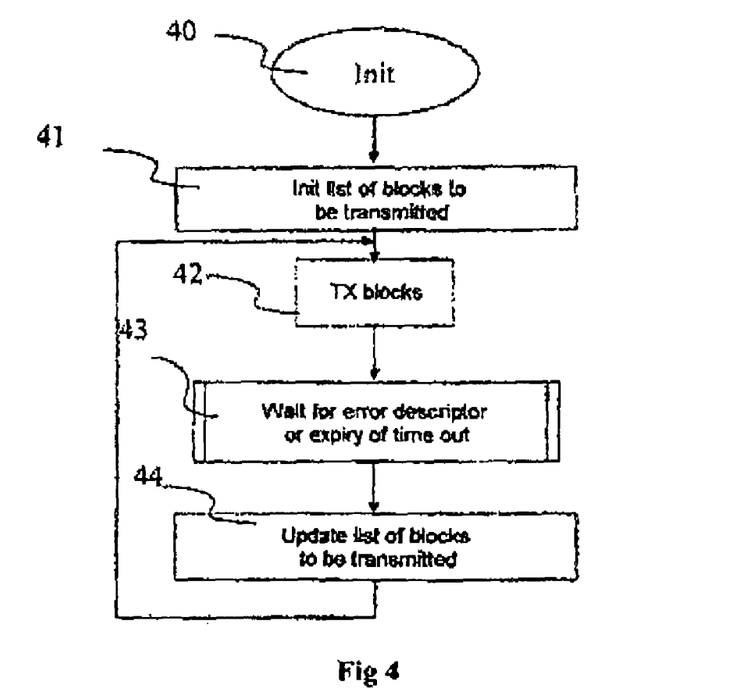
FIG. 4 diagrammatically illustrates an algorithm for transmitting data packets implemented in the apparatus of FIG. 3, according to a particular embodiment of the invention.
Figure 5:
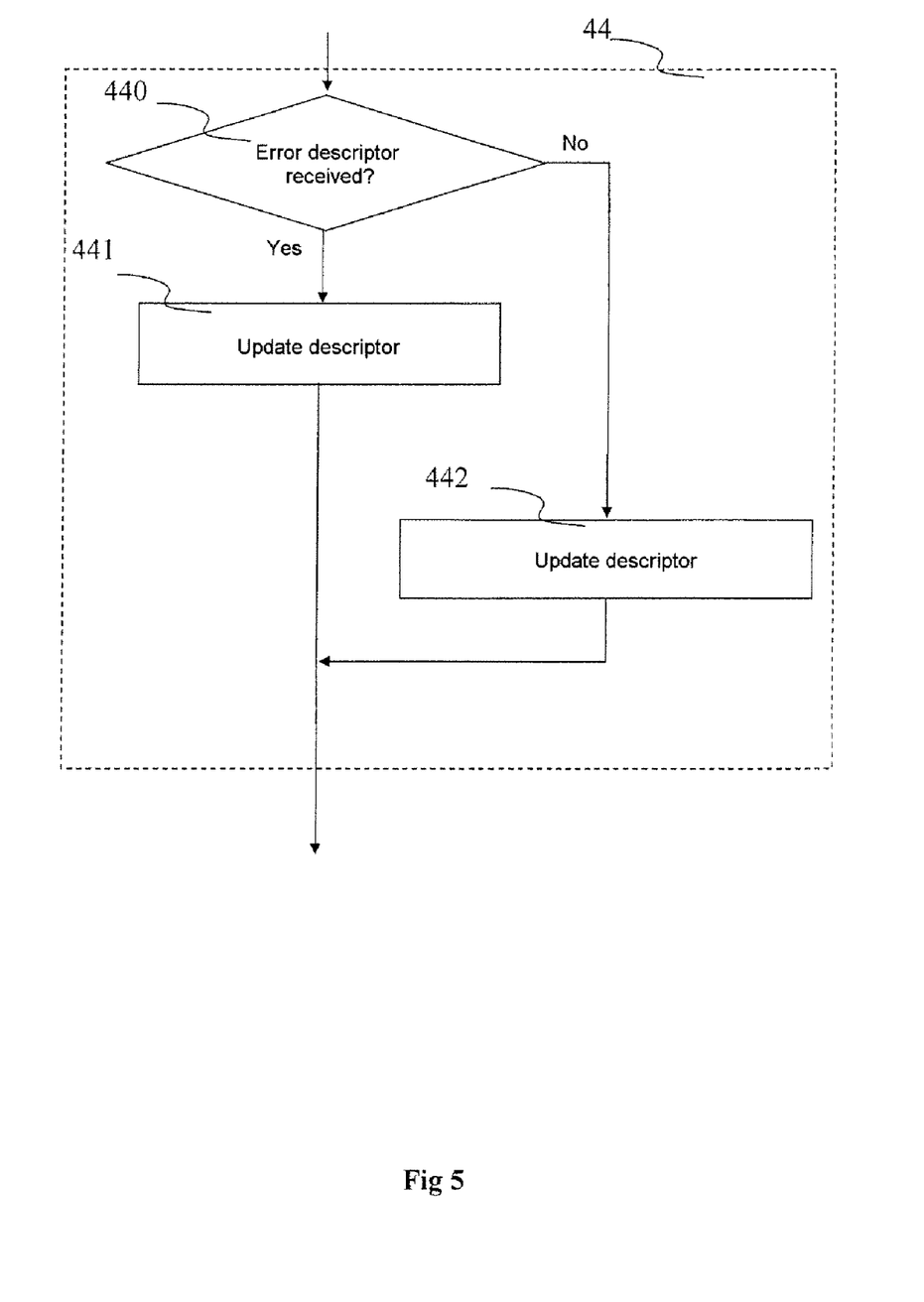
FIGS. 5 to 6 present a transmission method implemented in the apparatus of FIG. 3.

FIG. 4 diagrammatically illustrates an algorithm for transmitting data packets implemented in the apparatus 3.

In the course of a first step 40, the apparatus 3 initializes its various components and variables.

Then, in the course of a step 41, the CPU 31 initializes the list of blocks to be transmitted (for example, as a function of the arrival of blocks transmitted by an application not represented in FIG. 3 for reasons of clarity).

Thereafter, in the course of a step 42, the apparatus 3 transmits, on the wireless medium, the blocks corresponding to the list of the blocks to be transmitted while instigating a timeout.

Then, in the course of a step 43, the apparatus 3 waits for either an error descriptor or acknowledgement transmitted by the recipient of the blocks transmitted in the course of step 42, or the expiry of the timeout instigated in the course of step 42 (the error descriptor having possibly been lost). If an error descriptor is received, the CPU 31 updates the corresponding descriptor of blocks to be transmitted with the aid of a simple "AND" operation performed bitwise with the error descriptor received (assuming a value equal to 1 for an acknowledged block and 0 for an error). If the timeout expires, the CPU 31 updates the corresponding descriptor of blocks to be transmitted with the aid of a simple "AND" operation performed bitwise with the descriptor of acknowledged blocks (assuming a value equal to 1 for an acknowledged block), a block assumed to be transmitted (value 1 in the descriptor of blocks to be transmitted) then being marked to be transmitted since it is not acknowledged.

Thereafter, in the course of a step 44, the apparatus 3 updates the list of the blocks to be transmitted as a function of the error descriptor received (if appropriate). Step 42 is thereafter repeated.

These steps are implemented in part by the CPU 31 and in part by the module 37. The implementation of the software part by the CPU 31 is preferably performed in multi-task or pseudo multi-task form, steps 41, 42 and 44 being able to be performed by different tasks.

Figure 6:
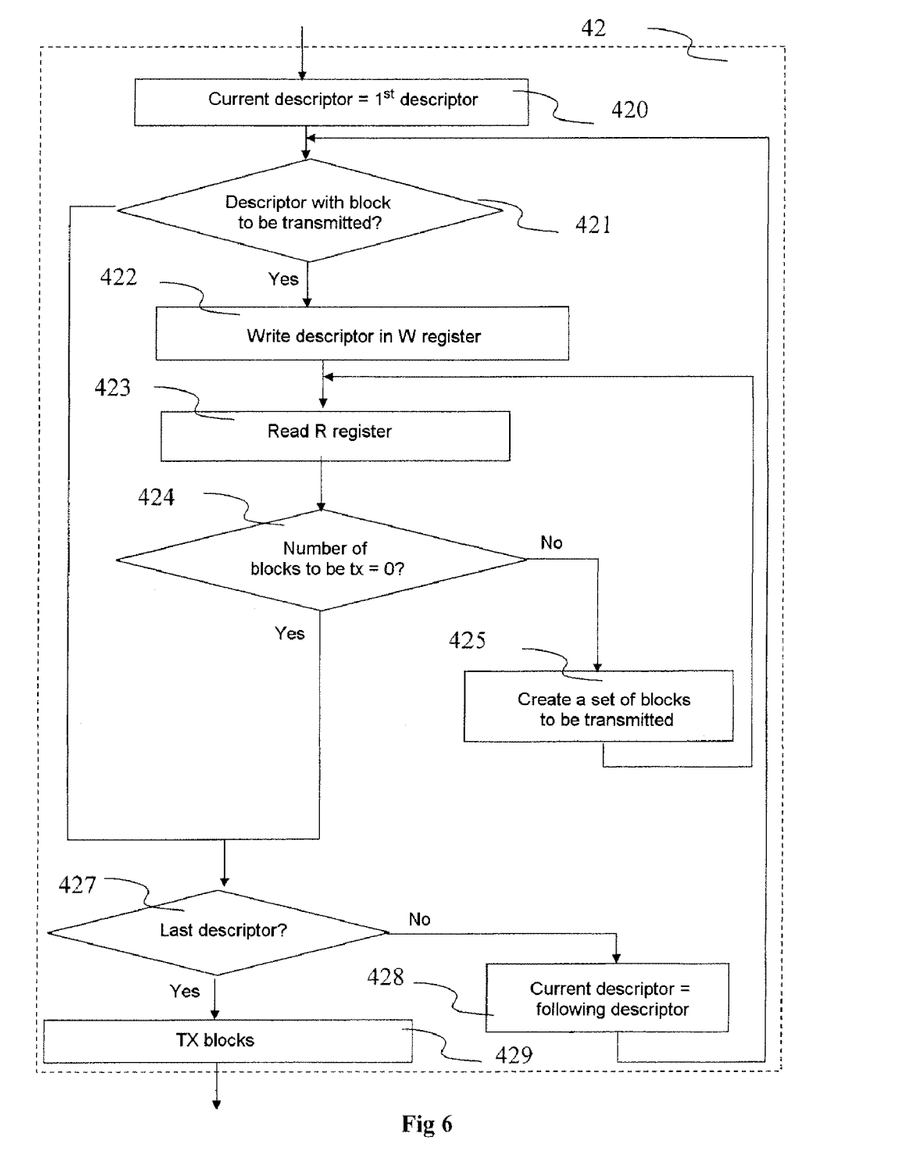

FIG. 6 presents in detail step 42 of transmitting blocks. The blocks are transmitted following the IEEE 801.16 standard.

The set of blocks to be transmitted possesses an associated status of the type "to be transmitted". When the block has been transmitted, its status changes and becomes "not to be transmitted". The status of each block is stored with the aid of the descriptors 3311 to 331N of 32 bits, each of the bits corresponding to the status of a precise block, the status of the first 32 blocks being stored in the descriptor 3311 and the status of the 32 blocks following being stored in the following descriptor 3312 and so on and so forth. For a maximum number of blocks equal to 2048, N equals 64.

When an MSDU packet has to be transmitted, it is split into blocks. Once the list of the blocks to be transmitted has been updated, the transmission of the blocks itself and their identification is performed according to procedures well known to the person skilled in the art and will not be detailed further. On the other hand, the updating of this list, the subject of the invention, performed during steps 42 and 44, is detailed hereafter.

In the course of a first step 420, the CPU 31 initializes a current descriptor variable or p with a pointer to the first descriptor 3311.

Then, in the course of a test 421, the CPU 31 verifies whether the current descriptor indicates blocks to be transmitted by comparing its content with the FFFFFFFFH (the suffix H indicating a hexadecimal notation).

If at least one block has to be transmitted, in the course of a step 422, the CPU 31 writes the content of the current descriptor to the register 3700. As indicated previously, the registers 3710 and 3711 are then updated with the aid of the module 372.

Then, in the course of a step 423, the CPU 31 reads the content of the registers 3710 and 3711 and stores it respectively in the registers 333 and 334 of the RAM memory 33.

Then, in the course of a test 424, the CPU 31 verifies that the number of blocks to be transmitted is not zero.

If the number of blocks to be transmitted is not zero, then, in the course of a step 425, the CPU creates a set of blocks to be transmitted and updates the memory 231p and step 423 is repeated.

Following a negative response to the test 421 or positive response to the test 424, in the course of a test 427, the CPU 32 verifies whether the current descriptor is the last descriptor to be tested.

In the negative, in the course of a step 428, the CPU 31 updates the current descriptor variable by pointing it at the following descriptor. Thereafter, step 422 is repeated.

In the affirmative, in the course of a step 429 (last step of step 42), if there are blocks to be transmitted, these blocks are transmitted on the wireless medium while updating transmission descriptors (not illustrated).

FIG. 6 presents in detail step 44 of updating the descriptors.

In the course of a test 440, the CPU 31 verifies that acknowledgement descriptors transmitted by the recipient of the MSDU packets are received.

In the affirmative, the CPU 31 updates the descriptors 3311 to 331N as a function of the descriptors received, the status bits set to 0 corresponding to blocks not acknowledged by the recipient, these blocks having to be retransmitted, and the status bits corresponding to blocks acknowledged.

In the negative, the CPU 31 updates the descriptors 3311 to 331N by indicating a status set to 0 for each of the blocks transmitted previously.

Step 44 is completed after the implementation of one of steps 441 or 442.

Figure 7:
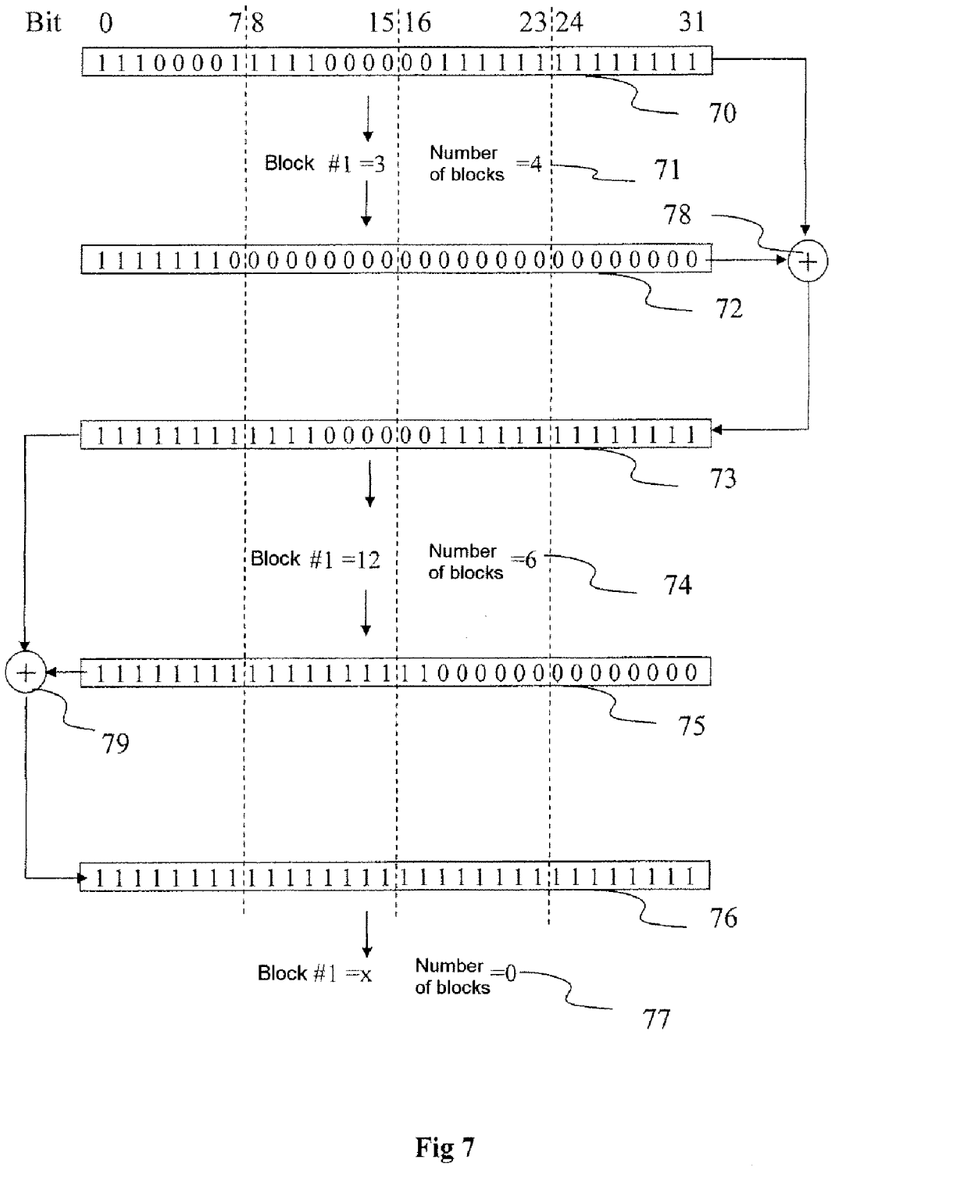
FIG. 7 gives an example of the evolution of content of registers implemented in the apparatus of FIG. 3.

By way of illustration, FIG. 7 gives an example of the evolution of content of registers corresponding to a particular descriptor.

Following the dispatch of 32 blocks corresponding to a descriptor, the apparatus 3 receives an error descriptor 70 that the CPU 31 writes to the memory 331 to 331N corresponding before processing it following steps 422 to 426. In particular, in the course of step 422, the CPU writes the content of the descriptor 70 to the register 3700. It is assumed, by way of illustration, that the content of the descriptor 70 is E1F03FFFH (represented in binary in FIG. 7), the first bits being represented on the left (high weight bits). The registers 3710 and 3711 then contain respectively 3 (the first 0 being in third position) and 4 (there are four consecutive 0s onwards of the third position). In the course of step 423, the CPU 31 reads the content of the registers 3710 and 3711 and the module 371 creates a mask 72 (equaling FE000000H) that it transmits to the module 370 which performs an operation 78 of "or" with the content 70 of the register 3700 so as to record a new value 73 (equaling FFF03FFFH) in the register 3700.

The value read of the number of blocks being equal to 4, step 423 is repeated. The registers 3710 and 3711 now comprise the respective values 12 and 6. In the course of step 423, the CPU 31 reads these values thereby bringing about the creation of a mask 75 equaling FFFFC000H by the module 371 and an operation 79 of "or" with the content 73 of the register 3700 by the module 370 and a recording of a descriptor 76 entirely set to 1 in the register 3700. The value of the number of blocks to be transmitted is then zero and the value of the 1$^{st}$ block is set to an arbitrary value or a predefined value not lying between 0 and 31 inclusive. In the course of the test 424, the CPU 31 then detects the end of the identification of the blocks to be transmitted for the current descriptor.

Of course, the invention is not limited to the embodiments described above.

In particular, the architecture of the sending/receiving apparatus can be different from that illustrated in FIG. 3, in the respective function and/or the form of the elements (the functions of the electronic elements can in particular be grouped together in a restricted number of components or, conversely, dispersed in several components) and their arrangement.

Furthermore, the module for managing blocks to be transmitted can also have a different structure, the translation functions being able to be in particular integrated with one of the modules associated with the registers.

Moreover, according to the invention, the module for managing blocks to be transmitted can be associated with the whole set of descriptors or, conversely, the apparatus can comprise several modules for managing blocks to be transmitted, each of these modules being associated with one or more descriptors.

Neither is the invention limited to the transmission of data according to a wireless communication standard (for example IEEE 802.16) but also relates to any transmission mode using descriptors of blocks of packets to be transmitted.

Moreover, according to variants of the invention, the descriptors of packets to be transmitted are not necessarily associated with error descriptors but correspond to particular statuses of any type having to bring about a transmission of data blocks (in particular expiry of a timeout).

According to a variant of the invention, the electronic module for managing blocks implements only one of the functions of determination of the first block to be transmitted or of determination of the number of consecutive status cues having or not having a value predetermined from a particular rank.

Furthermore, the invention is not limited to wireless transmissions but relates to all transmissions on any medium, and in particular on noisy wire channels or on a recording channel.

The invention claimed is:

1. Method for transmitting data packets, comprising: writing to a first register of at least one descriptor of packets to be transmitted, each descriptor of packets to be transmitted comprising information representative of a status of each packet to be transmitted, the status of each packet indicating whether said packet is or is not to be transmitted, the at least one descriptor of packets to be transmitted being updated with:
    at least an error descriptor when the at least an error descriptor is received before expiration of a timeout with the aid of an AND operation performed bitwise with the error descriptor received, and when the timeout expires, updating the corresponding descriptor of blocks to be transmitted with the aid of an AND operation performed bitwise with a descriptor of acknowledged packets;
    determining a first packet of data to be transmitted on the basis of the content of said first register and recording of an identifier of the first packet of data to be transmitted in a second register; and transmitting a set of data packets based on the updated descriptor of packets to be transmitted.

2. Method according to claim 1, wherein said determining the first packet is an elementary step performed in at most a number of clock cycles that is strictly less than the size of the first register expressed as a number of binary data.

3. Method according to claim 2, wherein said determining the first packet is an elementary step performed in at most one clock cycle.

4. Method according to claim 1, further comprising determining a number of consecutive packets to be transmitted with said first packet of data to be transmitted.

5. Method according to claim 4, wherein said determining the number of consecutive packets to be transmitted is an elementary step performed in at most a number of clock cycles that is strictly less than the size of the first register expressed as a number of binary data.

6. Method according to claim 5, wherein said determining the number of consecutive packets to be transmitted is an elementary step performed in at most one clock cycle.

7. Method according to claim 4, wherein said determining the first packet and of determining the number of consecutive packets to be transmitted are simultaneous.

8. Method according to claim 1, further comprising recording a number of consecutive packets to be transmitted in said second register.

9. Method according to claim 1, wherein the reading of the second register brings about a purely electronic updating of the first register, of the status of each packet indicated as having to be transmitted by the second register.

10. Method according to claim 9, wherein the reading of the second register and the updating of the corresponding first register are done in at most one clock cycle.

11. Method according to claim 1, wherein said determining the first packet of data to be transmitted on the basis of the content of said first register and of recording the identifier of the first packet of data to be transmitted in the second register are repeated as long as the descriptor comprises information representative of a status corresponding to said packets to be transmitted.

12. Method according to claim 1, wherein the packet corresponding to a status is identified, at least in part, by the position of an information representative of the status.

13. Method according to claim 1, wherein the transmission of said set of data packets is performed on a wireless channel.

14. Device for transmitting data packets, comprising: a first register for recording at least one descriptor of packets to be transmitted, each descriptor of packets to be transmitted comprising information representative of a status of each packet to be transmitted, the status of each packet indicating whether said packet is or is not to be transmitted, the at least one descriptor of packets to be transmitted being updated with:
  at least an error descriptor when the at least an error descriptor is received before expiration of a timeout with the aid of an AND operation performed bitwise with the error descriptor received, and when the timeout expires, updating the corresponding descriptor of blocks to be transmitted with the aid of an AND operation performed bitwise with a descriptor of acknowledged packets;
  a filter for determining a first packet of data to be transmitted on the basis of the content of said first register and a second register for recording an identifier of the first packet of data to be transmitted; and a transmitter for transmitting a set of data packets based on the updated descriptor of packets to be transmitted.

* * * * *